(12) United States Patent
Wallace et al.

(10) Patent No.: US 7,735,120 B2
(45) Date of Patent: Jun. 8, 2010

(54) SERVER COMPUTER ISSUED CREDENTIAL AUTHENTICATION

(75) Inventors: Leland A. Wallace, San Jose, CA (US); David M. O'Rourke, San Jose, CA (US)

(73) Assignee: Apple Inc., Cupertino, CA (US)

(*) Notice: Subject to any disclaimer, the term of this patent is extended or adjusted under 35 U.S.C. 154(b) by 1277 days.

(21) Appl. No.: 10/743,796

(22) Filed: Dec. 24, 2003

(65) Prior Publication Data

US 2005/0198489 A1 Sep. 8, 2005

(51) Int. Cl.
G06F 7/04 (2006.01)
G06F 12/00 (2006.01)

(52) U.S. Cl. .................... 726/5; 726/17
(58) Field of Classification Search ............. 726/5, 726/169, 17
See application file for complete search history.

(56) References Cited

U.S. PATENT DOCUMENTS

| | | | | |
|---|---|---|---|---|
| 5,751,812 A * | 5/1998 | Anderson | ................ | 713/155 |
| 5,764,890 A * | 6/1998 | Glasser et al. | ................ | 726/11 |
| 5,872,917 A * | 2/1999 | Hellman | ................ | 726/6 |
| 6,173,400 B1 * | 1/2001 | Perlman et al. | ................ | 713/172 |
| 6,535,980 B1 * | 3/2003 | Kumar et al. | ................ | 713/168 |
| 6,947,725 B2 * | 9/2005 | Aura | ................ | 455/410 |
| 6,973,482 B2 * | 12/2005 | Mohammed et al. | ................ | 709/208 |
| 7,024,695 B1 * | 4/2006 | Kumar et al. | ................ | 726/26 |
| 7,069,439 B1 * | 6/2006 | Chen et al. | ................ | 713/172 |
| 7,085,840 B2 * | 8/2006 | de Jong et al. | ................ | 709/229 |
| 7,155,607 B2 * | 12/2006 | Yokota et al. | ................ | 713/168 |
| 7,171,555 B1 * | 1/2007 | Salowey et al. | ................ | 713/156 |
| 7,363,500 B2 * | 4/2008 | Funk | ................ | 713/180 |
| 7,395,435 B2 * | 7/2008 | Benhammou et al. | ................ | 713/185 |
| 2002/0016777 A1 * | 2/2002 | Seamons et al. | ................ | 705/76 |
| 2003/0061512 A1 * | 3/2003 | Flurry et al. | ................ | 713/201 |
| 2003/0093680 A1 * | 5/2003 | Astley et al. | ................ | 713/183 |
| 2003/0163733 A1 * | 8/2003 | Barriga-Caceres et al. | ... | 713/201 |
| 2003/0182551 A1 * | 9/2003 | Frantz et al. | ................ | 713/170 |
| 2003/0212892 A1 * | 11/2003 | Oishi | ................ | 713/168 |
| 2004/0003241 A1 * | 1/2004 | Sengodan et al. | ................ | 713/168 |
| 2004/0068572 A1 * | 4/2004 | Wu | ................ | 709/229 |
| 2004/0078571 A1 * | 4/2004 | Haverinen | ................ | 713/168 |
| 2005/0033987 A1 * | 2/2005 | Yan et al. | ................ | 713/201 |
| 2005/0050328 A1 * | 3/2005 | Mizrah | ................ | 713/171 |
| 2005/0071677 A1 * | 3/2005 | Khanna et al. | ................ | 713/201 |
| 2005/0120213 A1 * | 6/2005 | Winget et al. | ................ | 713/171 |
| 2005/0138355 A1 * | 6/2005 | Chen et al. | ................ | 713/155 |
| 2005/0198489 A1 * | 9/2005 | Wallace et al. | ................ | 713/151 |

* cited by examiner

*Primary Examiner*—Techane J Gergiso
(74) *Attorney, Agent, or Firm*—Buchanan Ingersoll & Rooney PC

(57) ABSTRACT

A method for authenticating computers is disclosed. The method comprises issuing a credential from a first computer to a second computer. When the second computer authenticates to the first computer, the second computer transmits the credential and a first challenge to the first computer. The first computer determines whether the credential is valid, computes a first response to the first challenge, and generates a second challenge. The first computer transmits the first response and the second challenge to the second computer. The second computer determines whether the first response is valid and computes a second response to the second challenge. The second computer transmits the second response to the first computer in order to verify and authenticate the computers.

45 Claims, 5 Drawing Sheets

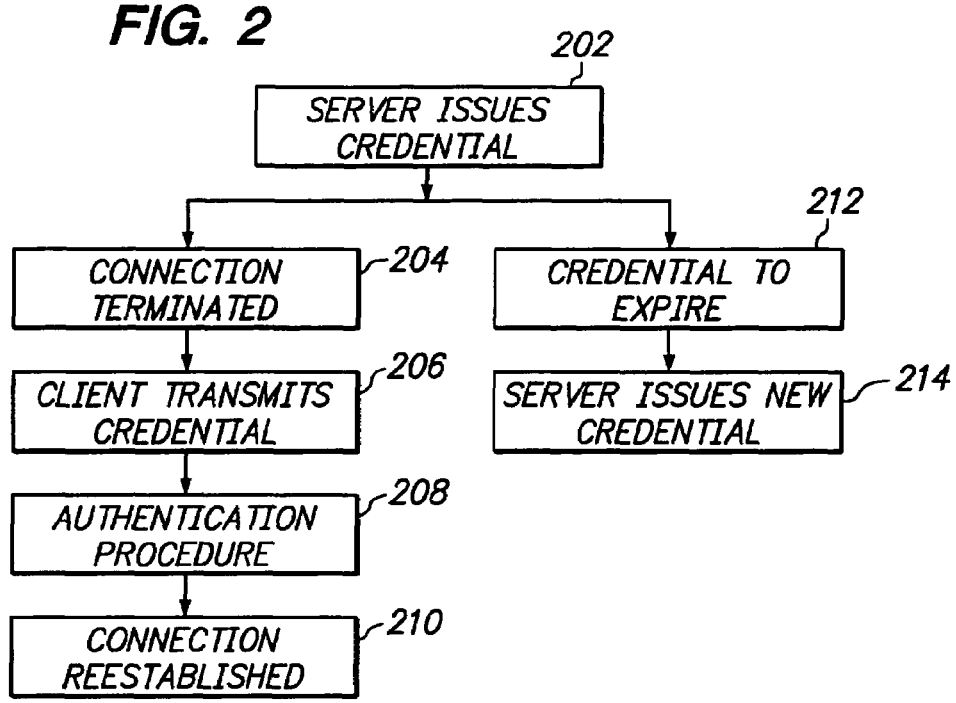
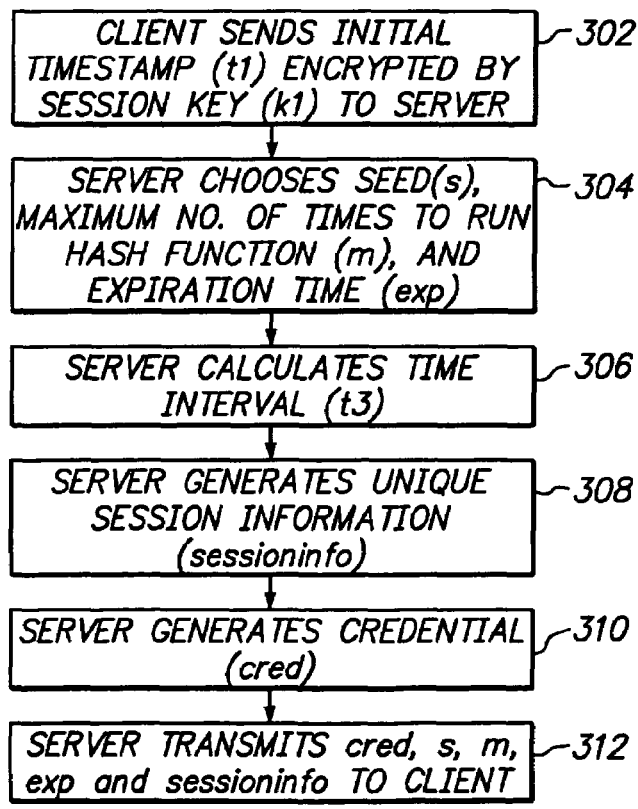

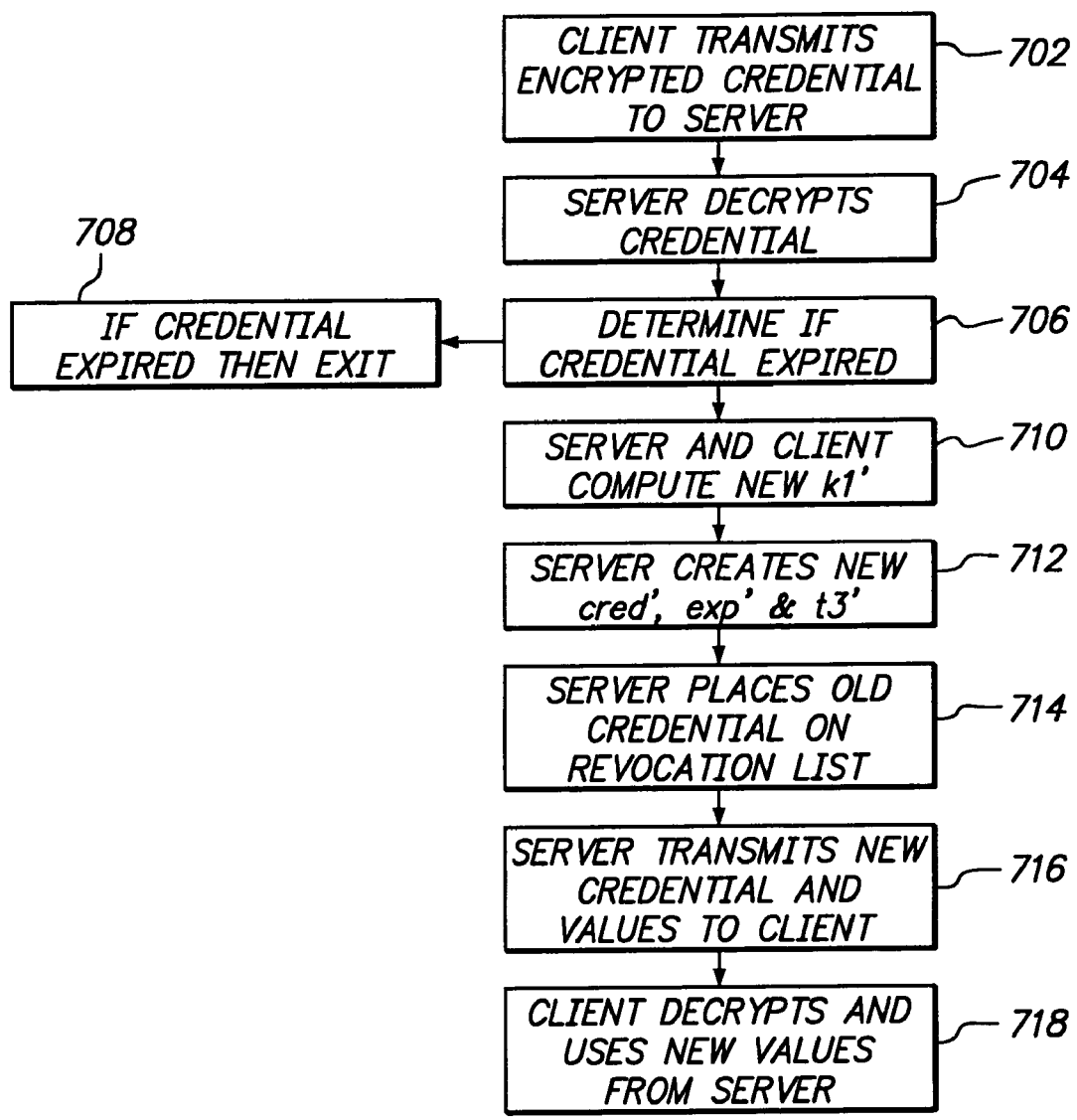

SERVER COMPUTER ISSUED CREDENTIAL AUTHENTICATION

FIELD OF THE INVENTION

The present invention generally relates to computer network security and more particularly to a system and method for providing a limited credential for authenticating access to network resources.

BACKGROUND OF THE INVENTION

In order to access network resources, a user enters identification and password information into a client computer that is transmitted to a server computer over a computer network for authentication. In turn, the server computer authenticates the client computer using the password and identification information, thereby allowing access to network resources. If the connection with the server computer is terminated, the user must re-enter the identification and password information into the client computer in order to re-authenticate and reconnect with the server computer. The user must re-enter the information because the password is not stored on the client computer for security reasons.

A "credential" can be issued to the client computer for facilitating the reconnect procedure. The credential is data that is used to prove the identity of the subject. In this instance, the credential is used by the client computer to authenticate the client computer to the server computer such that the user does not need to re-enter or store on the client computer the password information. There is no need for the client computer to transmit the identification and password information to the server computer if the client computer has the credential because the credential ensures with a high degree of reliability that the client computer should have access.

The credential is generated by a trusted third party (TTP) such as the type used with the Kerberos system. The TTP issues the credential that allows the client computer to authenticate itself to the server computer. The credential may be time limited and encrypted by the TTP using a symmetric algorithm and decrypted/verified by the server computer using the same. The TTP is used for a large aggregation of machines and contains all of the keys used for authentication by both users and machines.

A drawback with the TTP is that it requires significant infrastructure and is a separate entity that must be configured. Furthermore, the configuration information must be present on all of the server computers. Therefore, in order to implement a change, all of the machines (i.e. client and server computers), as well as the TTP, must be re-configured. Another drawback of the TTP is that it is a high value target because it contains all of the keys used for authentication.

Another type of authentication mechanism is pretty good privacy (PGP Ticket). A TTP (e.g., server administrator) issues a credential to a client computer that allows the server computer to authenticate the client computer. The credential issued to the client computer is time limited and digitally signed by the TTP using commonly known public key technology. The credential is interpreted/verified by the server computer.

A drawback with PGP Ticket is that the security and verifiability of the TTP's public key is weak. Furthermore, a change to the TTP's key requires revoking all of the old keys and updating all of the server computers and client computers with new keys. Additionally, if the TTP's key is compromised, then all of the server computers that rely on that key are also compromised.

SUMMARY OF THE INVENTION

In accordance with the present invention there is provided a method for authenticating computers. The method comprises a first computer (e.g., a server computer) issuing a credential to a second computer (e.g., a client computer). When the second computer attempts to authenticate with the first computer, the second computer generates a first challenge and transmits the credential and the first challenge to the first computer. The first computer determines whether the credential is valid and computes a first response to the first challenge. Additionally, the first computer generates a second challenge. The first computer transmits the first response and the second challenge to the second computer. In order to authenticate the first computer, the second computer determines whether the first response is valid. The second computer also computes a second response to the second challenge. The second computer transmits the second response to the first computer which then determines whether the second response is valid in order to authenticate the second computer and establish a connection.

The credential may be encrypted before issuing it to the second computer and transmitting it from the second computer to the first computer. Similarly, the first challenge, the first response, the second challenge, and the second response may be encrypted before transmission. Each of the first challenges and responses, as well as the second challenges and responses, are decrypted upon receipt by the first or second computers.

The second challenge may be a random number such as a nonce generated by the first computer. The second computer computes a second response to the first computer challenge by performing a predetermined function on the random number. The first computer determines whether the second response is valid by performing the predetermined function on the random number and comparing the result to the second response. The predetermined function may be a hash function.

Similarly, the first challenge may be a random number such as a nonce. The first computer computes a first response to the first challenge by performing a predetermined function on the random number. The second computer determines whether the first response is valid by performing the predetermined function on the random number and comparing the result to the first response.

The credential may be issued with an expiration time. Once the expiration time has been reached, the credential is no longer valid.

In accordance with the present invention, there is provided a computer-readable medium containing a program with instructions to execute the authentication between a first computer and a second computer. The instructions issue a credential from the first computer to the second computer. The credential and a first challenge are transmitted from the second computer to the first computer when the second computer is to be authenticated. The first computer determines whether the credential is valid and computes a response to the first challenge. Furthermore, the first computer generates a second challenge that is transmitted to the second computer with the first response. The second computer determines whether the first response is valid and computes a second response to the second challenge. The second response is transmitted to the first computer and the first computer determines whether the second response is valid in order to authenticate the second computer.

A system for authenticating computers has a first computer and a second computer in communication with each other. The first and second computers are configured to execute instructions which authenticate the second computer. Specifically, the first computer issues a credential to the second computer. In order to be authenticated, the second computer transmits the credential along with a first challenge to the first computer. The first computer is configured to determine whether the credential is valid and computes a first response to the first challenge. The first computer generates and transmits a second challenge and the first response to the second computer which verifies the first response and generates a second response. The second response is transmitted from the second computer to the first computer in order to authenticate the second computer.

BRIEF DESCRIPTION OF THE DRAWINGS

These, as well as other features of the present invention, will become more apparent upon reference to the drawings wherein:

FIG. 2 is a flowchart illustrating how a reconnect credential is used by a server computer to authenticate a client computer;

FIG. 3 is a flowchart illustrating how a reconnect credential is issued by the server computer;

FIG. 7 is a flowchart illustrating how a reconnect credential is reissued to a client computer.

DETAILED DESCRIPTION

Various aspects will now be described in connection with exemplary embodiments, including certain aspects described in terms of sequences of actions that can be performed by elements of a computer system. For example, it will be recognized that in each of the embodiments, the various actions can be performed by specialized circuits, circuitry (e.g., discrete and/or integrated logic gates interconnected to perform a specialized function), program instructions executed by one or more processors, or by any combination. Thus, the various aspects can be embodied in many different forms, and all such forms are contemplated to be within the scope of what is described. The instructions of a computer program as illustrated in FIGS. 2-7 for issuing and reconnecting with an authentication credential can be embodied in any computer-readable medium for use by or in connection with an instruction execution system, apparatus, or device, such as a computer based system, processor containing system, or other system that can fetch the instructions from a computer-readable medium, apparatus, or device and execute the instructions.

As used herein, a "computer-readable medium" can be any means that can contain, store, communicate, propagate, or transport the program for use by or in connection with the instruction execution system, apparatus, or device. The computer-readable medium can be, for example but is not limited to, an electronic, magnetic, optical, electromagnetic, infrared, or semiconductor system, apparatus, device, or propagation medium. More specific examples (a non exhaustive list) of the computer readable-medium can include the following: an electrical connection having one or more wires, a portable computer diskette, a random access memory (RAM), a read only memory (ROM), an erasable programmable read only memory (EPROM or Flash memory), an optical fiber, and a portable compact disc read only memory (CDROM).

Figure 1:
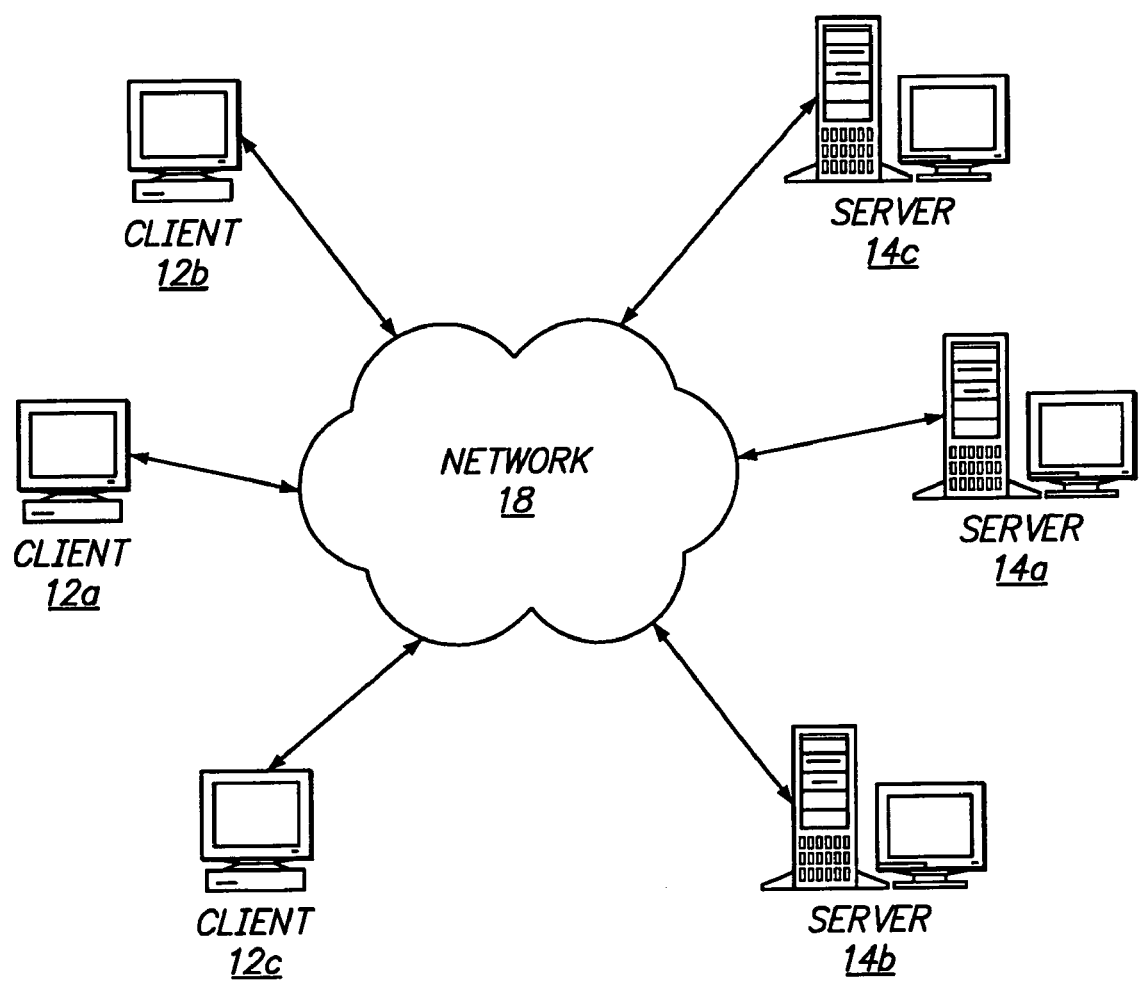
FIG. 1 is a network diagram.
Figure 4:
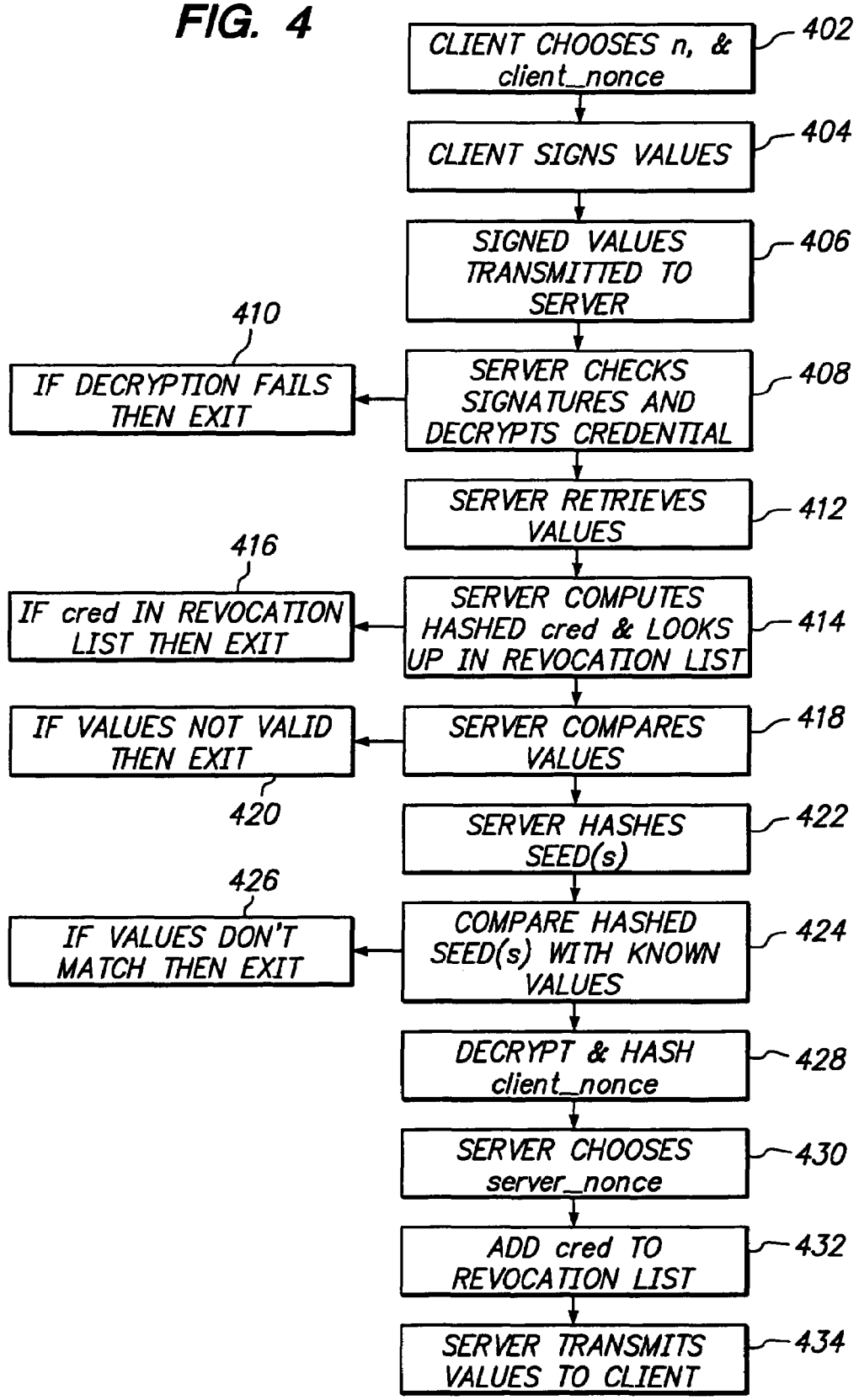
FIGS. 4-6 are flowcharts illustrating how a client computer uses the reconnect credential to authenticate with the server computer.

Referring now to the drawings wherein the showings are for purposes of illustrating preferred embodiments of the present invention only, and not for purposes of limiting the same, FIG. 1 illustrates client computers 12a, 12b, 12c connected to a network 18. Server computers 14a, 14b, and 14c are also connected to the network 18. In order for a client computer 12 to access a server computer 14, the client computer 12 transmits user identification and password information to the desired server 14. The server computer 14 uses this information to authenticate the client computer 12 and establish a connection.

FIG. 2 is a flowchart showing how the reconnect credential is used is shown. In step 202, the server computer 14 issues a credential. Referring to FIG. 3, one embodiment of a method of initially issuing the credential from the server computer 14 to the client computer 12 is shown. The client computer 12 already has an agreed upon initial session key (k1), while the server computer 14 has a long term server key (ks) and the initial session key (k1). In step 302, the client computer sends the initial timestamp (t1) encrypted using the initial session key (k1) to the server computer 14. In step 304, the server computer chooses security parameters and an expiration time (exp) for the credential. In the illustrated embodiment, the security parameters include a hash seed (s), and a maximum number of times (m) to run a hash function. In step 306, the server computer 14 calculates a time interval (t3) that is the time interval between the clock of the server computer 14 and initial timestamp (t1). Information that uniquely identifies the session (sessioninfo) is generated in step 308 by the server computer 14 in order to distinguish the session from other sessions.

The server computer 14 generates a credential (cred) for the client computer 12 in step 310. As previously discussed, the credential proves the identity of the client computer 12. For the embodiment shown in FIG. 3, the credential (cred) is generated using the long term server key (ks) and the seed (s), the maximum number of times (m) to run the hash function, the expiration time (exp), the time interval (t3), and username (user/domain) information to uniquely determine the client computer 12. It will be recognized by those of ordinary skill in the art that there may be other methods of generating the credential in order to prove the identity of the client computer 12. In step 312, the server computer 14 transmits the session information (sessioninfo), seed (s), maximum times (m) to run the hash function, the expiration time (exp), and the credential (cred) encrypted by the initial session key (k1) to the client computer 12 in order to issue the credential.

The credential received by the client computer 12 is used to re-establish a seamless connection with the server computer 14. In the reconnect procedure shown in FIG. 2, the connection between the server computer 14 and the client computer 12 is terminated in step 204. The connection may be lost by unexpected session termination. In order to reconnect, the client computer 12 transmits the credential to the server computer 14 in step 206. In step 208, the process of authenticating the client computer 12 and server computer 14 with the credential issued from step 202 is performed. Once the authentication is complete, the connection is reestablished in step 210.

Referring to FIGS. 4A-4B, the method from step 208 for authenticating the client computer 12 and the server computer 14 with the credential issued in step 202 is shown. The client computer 12 has the credential (cred), seed (s), and maximum number of times (m) to perform the hash function. In step 402, the client computer 12 chooses the number of times (n) to run the hash function. Also, the client computer 12 chooses a client computer challenge such as a random number (client_nonce) for security purposes. The client computer 12 then signs the data using a hashed message authentication code (HMAC) and hashed seed (s) data in step 404. The data to be signed is the credential (cred), the client computer's random number (client_nonce), the number of times (n) to run the hash function, the timestamp (t2) and the seed (s) data hashed n and (n−1) times. The data signed by the HMAC is then transmitted from the client computer 12 to the server computer 14 in step 406.

In step 408, the server computer 14 checks the signatures and decrypts the credential (cred) using the long term server key (ks). If the decrypt fails, then the process exits in step 410. If the decrypt does not fail, then in step 412, the server computer 14 retrieves the seed (s), the maximum number of times (m) to perform the hash function, the expiration time of the credential (exp), and the time interval (t3).

The server computer 14 hashes the credential (cred) and determines if the credential (cred) is in a revocation list in step 414. If the hashed credential (cred) is in the revocation list, then the credential (cred) is not valid and the process exits in step 416. However, if the hashed credential (cred) is not in the revocation list, then the process proceeds to step 418 where the server computer 14 checks to see if the expiration time (exp) of the credential (cred) has been exceeded. If the time has been exceeded then the credential (cred) is not valid and the process exits in step 420. Furthermore, in step 418, the server computer 14 determines whether the maximum number of times (m) to perform the hash function is greater than or equal to the number of times (n) to perform the hash function. If m is not greater than or equal to n then the process exits in step 420. Furthermore, the server computer 14 validates HMAC(s) and the user/domain in step 418. If either one of these values is invalid, then the process exits in step 420.

The server computer 14 performs two separate hashes. It hashes the seed (s) data n number of times ((s)H(n)) and n−1 times ((s)H(n−1)) in step 422. In step 424, the server computer 14 compares the values of (s)H(n) and (s)H(n−1) found in step 422 with the values decrypted in step 408. If the values do not match, then the process exits in step 426.

Next, in step 428, the server computer 14 decrypts and hashes the client_nonce to generate a server computer response. The server computer 14 then chooses a server computer challenge such as a random number (server_nonce) in step 430. In step 432, the server computer 14 adds the hashed credential (cred) to the revocation list so that it cannot be used again. In order to continue authentication of the credential, in step 434 the server computer 14 encrypts and transmits the server_nonce chosen in step 430, the hashed client_nonce from step 428 using as a key the seed data (s) hashed n−1 times.

Figure 5:
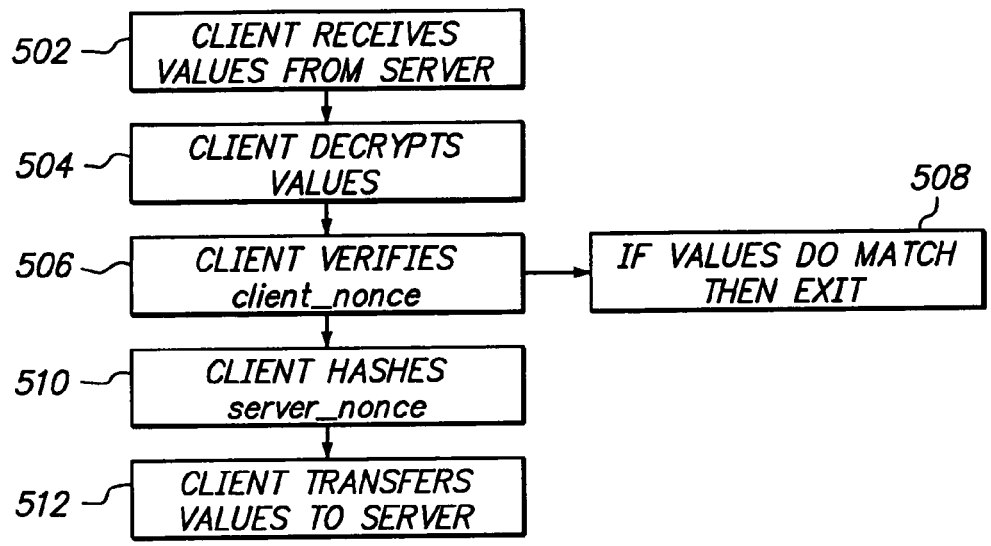

Referring to FIG. 5, the process of authenticating the client computer 12 is continued. Specifically, in step 502, the client computer 12 receives the message containing the server_nonce, the hashed client_nonce, encrypted using the seed data (s) hashed n−1 times as the key, transmitted by the server computer 14 in step 434. In step 504, the client computer 12 decrypts the message received in step 502. Next, in step 506, the client computer 12 verifies the hashed client_nonce by comparing it with the known value. If the values do not match, then the process exits in step 508. However, if the values do match, then the client computer 12 can be assured that the server computer 14 is authentic because it successfully hashed the client_nonce. In step 510, the client computer 12 hashes the server_nonce received from step 502 to generate a client computer response. In order to verify to the server computer 14 that the client computer 12 has successfully received the message, the client computer 12 transmits the hashed server_nonce encrypted with the seed (s) hashed n−1 times to the server computer 12 in step 512.

Figure 6:
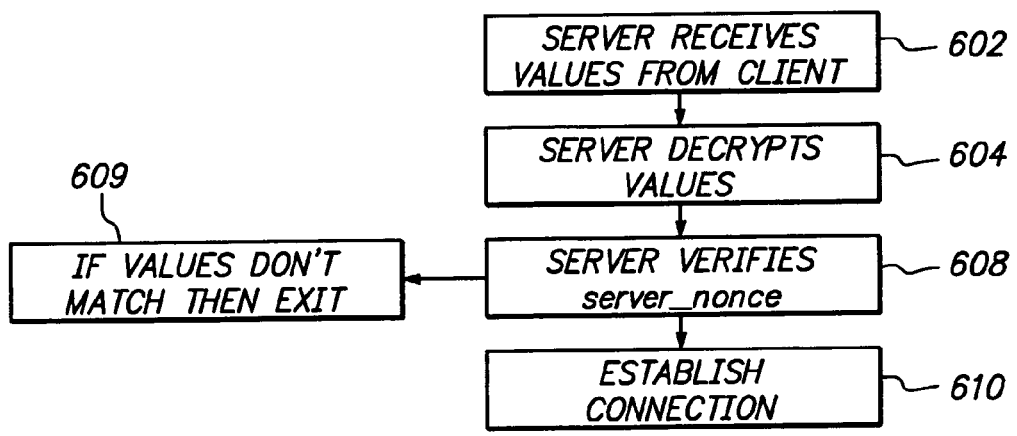

Referring to FIG. 6, the server computer 14 receives the message from step 512 and decrypts the message in step 604. The server computer 14 verifies the hashed server_nonce by comparing it to a known value in step 608. If the server_nonce does not match the value generated earlier by the server computer 14, then the process exits in step 609. However, if the server_nonce is verified, then both the server computer 14 and the client computer 12 are authenticated to each other and a connection can be established in step 610.

It is possible that the credential expires before being used by the client computer 12. As previously discussed, the credential includes an expiration time (exp) after which the credential cannot be used. If the credential is not used before the expiration time, the credential is invalid. Therefore, it is necessary to re-issue a valid credential to the client computer 12 before the end of the expiration time. Any reasonable rule can be used to determine when to reissue a credential prior to or after its expiration. As seen in FIG. 2, the credential is about to expire in step 212. Accordingly, in step 214, the server computer 14 re-issues the credential to the client computer 12.

Referring to FIG. 7, one embodiment of a method for reissuing the credential is shown while the client computer 12 is still connected to the server computer 14. The client computer 12 has the credential (cred), seed (s) data, and initial session key (k1). The server computer 14 has the long term server key (ks), the initial session key (k1), and the unique name to identify the session (sessioninfo). In step 702, the client computer 12 transmits the credential (cred) and the new timestamp (t1) encrypted by the initial session key (k1) to the server computer 14. The server computer 14 receives and decrypts the message from the client computer 12 in step 704. Next, the server computer 14 determines if the credential (cred) has expired in step 706. If the time limit for the credential has expired, then the process exits in step 708. If the time limit has not expired, then the process proceeds to step 710 where both the client computer 12 and the server computer 14 compute a new session key (k1') that is equal to the hash of the credential (cred) and the seed (s). The server computer 14 creates a new credential (cred') in step 712 with a new seed (s'), new expiration time (exp') and new time interval (t3'). The server computer 14 places the old credential (cred) on the revocation list of invalid credentials in step 714. Once the old credential (cred) is on the revocation list, then the server computer 14 transmits the new credential (cred'), new seed (s'), new maximum times (m') to perform the hash function, the new expiration time (exp'), and the session information (sessioninfo) to the client computer 12 in step 716. The message from the server computer 14 to the client computer 12 is encrypted using the new session key (k1'). In step 718, the client computer 12 decrypts the message using the new session key (k1') to retrieve the new credential and values.

In order to provide added security, the long term server key (ks) can be changed. In order to change the long term server key (ks), the server computer 14 generates a cutoff date (cutoff_date) that is later than or equal to the expiration date (exp). Next, the server computer 14 generates a new long term server key (ks'). The cutoff date (cutoff_date), the original long term server key (ks), and the new long term server key (ks') are stored at the server computer 14. When attempting to decrypt a credential, the server computer 14 first uses the original long term server key (ks) and if that fails then uses the new long term server key (ks'). New credentials are issued using the new long term server key (ks'). When the cutoff date (cutoff_date) has passed, then the long term server key (ks) should be set to the new long term server key (ks') because all of the old credentials issued using the long term server key (ks) have expired. Also, once the cutoff date has passed, the revocation list of invalid credentials can be purged and the server computer 14 can issue a new long term server key using the method just described.

The reconnect authentication method described above provides security against common attacks. For example, because the client computer 12 and the server computer 14 transmit encrypted client_nonce and server_nonce which require the knowledge of the seed (s), the ability to stage a Man-in-the-Middle (MitM) attack where an attacker intercepts and possibly alters data traveling along the network is decreased. The method also provides security against reply attacks where an attacker bugs the network data and reuses it when needed because the messages between the client computer 12 and the server computer 14 include a timestamp which prevent reuse at another time. Reflection attacks where an attacker re-transmits a message created by a user and obtains a right of access are thwarted by using chained nonces and having the user information (user/domain) in the credential. Furthermore, reflection attacks are reduced by having each message between the client computer 12 and server computer 14 be non-symmetric and using a unique long term server key (ks). The chained nonces also provide against interleaved attacks where an attacker disguises oneself under a different identity during communication. A chosen text attack where an attacker tampers with the message and attacks the cryptography algorithm itself is reduced by not using the long term server computer key (ks) to encrypt any data that is obtained from the client computer 12. Finally, forced delay attacks where an attacker intercepts the data in the protocol to use later are reduced by using timestamps and an expiration time for the credential, as well as using a revocation list.

It will be appreciated by those of ordinary skill in the art that the concepts and techniques described here can be embodied in various specific forms without departing from the essential characteristics thereof. For example, the authentication between the server computer 14 and the client computer 12 may be a single challenge whereby the client computer 12 does not need to retransmit any more information to the server computer 14 after sending the credential and challenge. The presently disclosed embodiments are considered in all respects to be illustrative and not restrictive. The scope of the invention is indicated by the appended claims, rather than the foregoing description, and all changes that come within the meaning and range of equivalents thereof are intended to be embraced.

What is claimed is:

1. A method for authenticating a computing device, the method comprising the following steps:
    issuing a credential based on session information, a hash seed, a maximum iterative value, credential information and an expiration time from a first computing device to a second computing device;
    upon a loss of connection, transmitting said credential and a computer challenge from the second computing device to the first computing device;
    transmitting a response to said computer challenge from said first computing device to said second computing device; and
    verifying said response with said second computing device in order to authenticate and verify said computing devices and reestablish said connection,
    wherein:
        the challenge is a random number generated by the second computing device, and
        the first computing device computes the response to the challenge by performing a predetermined function on the random number.

2. The method of claim 1 wherein the second computing device determines whether the first computing device response is valid by performing the predetermined function on the random number and comparing the result to the response.

3. The method of claim 2 wherein the predetermined function is a hash function.

4. The method of claim 1 wherein the second computing device establishes a connection with the first computing device when the response is valid.

5. The method of claim 1 wherein the first computing device determines whether the credential transmitted from the second computing device is valid by determining whether the expiration time of the credential has been exceeded.

6. A system for authenticating a computer, the system comprising:
    a first computer; and
    a second computer in communication with the first computer;
    wherein the first computer and the second computer are configured to execute the following instructions:
        issue a credential based on session information, a hash seed, a maximum iterative value, credential information and an expiration time from the first computer to the second computer;
        upon a loss of connection, transmit the credential and a challenge from the second computer to the first computer;
        transmit a response to the challenge from the first computer to the second computer; and
        verify the response with the second computer in order to authenticate and verify the computers and re-establish said connection,
    wherein:
        the second computer is configured to generate a challenge that is a random number, and
        the first computer is configured to generate a response to the challenge by performing a predetermined function on the random number.

7. The system of claim 6 wherein the second computer is configured to determine whether the response is valid by performing the predetermined function on the random number and comparing the result to the response.

8. The system of claim 7 wherein the predetermined function is a hash function.

9. The system of claim 6 wherein the second computer establishes a connection with the first computer when the response is valid.

10. The system of claim 6 wherein the first computer determines whether the credential transmitted from the second computer is valid by determining whether the expiration time of the credential has been exceeded.

11. A method for authenticating a computer, the method comprising the steps:
    issuing a credential based on session information, a hash seed, a maximum iterative value, credential information and an expiration time from a first computer to a second computer;

generating with the second computer a first challenge;

transmitting the credential and the first challenge from the second computer to the first computer;

determining with the first computer whether the credential is valid;

computing a first response to the first challenge and generating a second challenge with the first computer;

transmitting the first response and the second challenge from the first computer to the second computer;

determining with the second computer whether the first response is valid;

computing a second response to the second challenge with the second computer;

transmitting the second response from the second computer to the first computer; and determining with the first computer whether the second response is valid to verify and authenticate the computers.

12. The method of claim 11 wherein the second computer encrypts the credential before transmitting the credential to the first computer.

13. The method of claim 11 wherein the first computer challenge is a random number generated by the second computer and the first computer computes a first response to the first challenge by performing a predetermined function on the random number.

14. The method of claim 13 wherein the second computer determines whether the first response is valid by performing the predetermined function on the random number and comparing the result to the first response.

15. The method of claim 13 wherein the predetermined function is a hash function.

16. The method of claim 11 wherein the second challenge is a random number generated by the first computer and the second computer computes a second response to the second challenge by performing a predetermined function on the random number.

17. The method of claim 16 wherein the first computer determines whether the second response is valid by performing the predetermined function on the random number and comparing the result to the second response.

18. The method of claim 17 wherein the predetermined function is a hash function.

19. The method of claim 11 wherein the first computer determines whether the credential transmitted from the second computer is valid by determining whether the expiration time of the credential has been exceeded.

20. The method of claim 11 further comprising the steps of:

encrypting the first challenge with the second computer before transmitting to the first computer;

decrypting the first challenge with the first computer before determining whether the first response is computed;

encrypting the first response and the second challenge with the first computer before transmitting;

decrypting the first response and the second challenge with the second computer before determining whether the first response is valid and the second response is computed;

encrypting the second response with the second computer before transmitting; and decrypting the second response with the first computer before determining whether the second response is valid.

21. The method of claim 20 wherein the credential is encrypted before issuing the credential to the second computer and the credential is decrypted by the first computer when returned by the second computer.

22. A computer-readable storage medium containing a program with instructions that execute the following procedure:

issue a credential based on session information, a hash seed, a maximum iterative value, credential information and an expiration time from a first computer to a second computer;

generate a first challenge with the second computer;

transmit the credential and the first challenge from the second computer to the first computer;

determine with the first computer whether the credential is valid;

compute a first response to the first challenge and generate a second challenge with the first computer;

transmit the first response and the second challenge from the first computer to the second computer;

determine with the second computer whether the first response is valid to verify the first computer;

compute a second response to the second challenge with the second computer;

transmit the second response from the second computer to the first computer; and determine with the first computer whether the second response is valid to verify and authenticate the computers.

23. The computer-readable storage medium of claim 22 having instructions for the second computer to encrypt the credential before transmitting the credential to the first computer.

24. The computer-readable storage medium of claim 22 having instructions for the second computer to generate the first challenge that is a random number and the first computer computes a first response to the first challenge by performing a predetermined function on the random number.

25. The computer-readable storage medium of claim 24 wherein the second computer determines whether the first response is valid by performing the predetermined function on the random number and comparing the result to the first response.

26. The computer-readable storage medium of claim 25 wherein the predetermined function is a hash function.

27. The computer-readable storage medium of claim 22 having instructions for the first computer to generate a second challenge that is a random number and the second computer computes a second response to the second challenge by performing a predetermined function on the random number.

28. The computer-readable storage medium of claim 27 wherein the first computer determines whether the second response is valid by performing the predetermined function on the random number and comparing the result to the second response.

29. The computer-readable storage medium of claim 28 wherein the predetermined function is a hash function.

30. The computer-readable storage medium of claim 22, wherein the first computer determines whether the credential transmitted from the second computer is valid by determining whether the expiration time of the credential has been exceeded.

31. The computer-readable storage medium of claim 22 further comprising instructions for:

encrypting the first challenge with the second computer before transmitting to the first computer;

decrypting the first challenge with the first computer before the first response is computed;

encrypting the first response and the second challenge with the first computer before transmitting;

decrypting the first response and the second challenge with the second computer before determining whether the first response is valid and the second response is computed;

encrypting the second response with the second computer before transmitting; and decrypting the second response with the first computer before determining whether the second response is valid.

32. The computer-readable storage medium of claim 31 wherein the instructions further comprise encrypting the credential before issuing the credential to the second computer and decrypting the credential with the first computer when returned from the second computer.

33. A system for authenticating a computer, the system comprising:

a first computer; and a second computer in communication with the first computer;

wherein the first computer and the second computer are configured to execute the following instructions:

issue a credential based on session information, a hash seed, a maximum iterative value, credential information and an expiration time from the first computer to the second computer;

generate a first challenge with the second computer;

transmit the credential and the first challenge from the second computer to the first computer;

determine with the first computer whether the credential is valid;

compute a first response to the first challenge and generate a second challenge with the first computer;

transmit the first response and the second challenge from the first computer to the second computer;

determine with the second computer whether the first response is valid;

compute a second response to the first challenge with the second computer;

transmit the second response from the second computer to the first computer; and determine with the first computer whether the second response is valid to authenticate and verify the computers.

34. The system of claim 33 wherein the second computer is configured to encrypt the credential before transmitting the credential to the first computer.

35. The system of claim 33 wherein the second computer is configured to generate a first challenge that is a random number and the first computer is configured to compute a first response to the first challenge by performing a predetermined function on the random number.

36. The system of claim 35 wherein the second computer is configured to determine whether the first response is valid by performing the predetermined function on the random number and compare the result to the first response.

37. The system of claim 36 wherein the predetermined function is a hash function.

38. The system of claim 33 wherein the first computer is configured to generate a second challenge that is a random number and the second computer is configured to compute a second response to the second challenge by performing a predetermined function on the random number.

39. The system of claim 38 wherein the first computer is configured to determine whether the second response is valid by performing the predetermined function on the random number and comparing the result to the second response.

40. The system of claim 39 wherein the predetermined function is a hash function.

41. The system of claim 33 wherein the first computer is configured to determine whether the credential transmitted from the second computer is valid by determining whether the expiration time of the credential has been exceeded.

42. The system of claim 33 wherein the first computer and the second computer are configured to:

encrypt the first challenge with the second computer before transmitting to the first computer;

decrypt the first challenge with the first computer before the first response is computed;

encrypt the first response and the second challenge with the first computer before transmitting;

decrypt the first response and the second challenge with the second computer before determining whether the first response is valid and the second response is computed;

encrypt the second response with the second computer before transmitting; and decrypt the second response with the first computer before determining whether the second response is valid.

43. A method of authentication performed between a first user with a first computer and a second user with a second computer, the method comprising the steps of:

issuing a credential based on session information, a hash seed, a maximum iterative value, credential information and an expiration time from the first user to the second user;

generating a first challenge with the second user;

transmitting the credential and the first challenge to the first user;

determining with the first user whether the credential is valid;

generating with the first user a first response to the first challenge and a second challenge;

transmitting the first response and the second challenge to the second user;

determining with the second user whether the first response is valid;

generating with the second user a second response to the second challenge;

transmitting the second response to the first user; and determining with the first user whether the second response is valid in order to authenticate and verify the first and second users.

44. A method for authenticating a computer, the method comprising the following steps:

issuing a credential based on session information, a hash seed, a maximum iterative value, credential information and an expiration time from a first computer to a second computer;

in response to a connection between the first computer and the second computer being terminated, transmitting said credential and a computer challenge from the second computer to the first computer when the second computer is to be authenticated;

transmitting a response to said computer challenge from said first computer to said second computer; and verifying at said second computer whether said response is valid, wherein said second computer re-establishes a connection with the first computer when the response is valid, wherein:

the challenge comprises a random number generated by the second computer, the first computer generates the response to the challenge by calculating a predetermined function of the random number, and the second computer verifies whether the response is valid by calculating the predetermined function of the random number and comparing the result of the calculation to the response.

45. The method of claim 44, the method further comprising:

checking at the first computer whether the credential transmitted from the second computer is valid by determining whether the expiration time of the credential has been exceeded.

* * * * *

UNITED STATES PATENT AND TRADEMARK OFFICE
CERTIFICATE OF CORRECTION

PATENT NO. : 7,735,120 B2
APPLICATION NO. : 10/743796
DATED : June 8, 2010
INVENTOR(S) : Leland A. Wallace et al.

Page 1 of 1

It is certified that error appears in the above-identified patent and that said Letters Patent is hereby corrected as shown below:

In column 2, line 16, delete "challenge:" and insert -- challenge. --, therefor.

In column 8, line 3, in Claim 1, delete "reestablish" and insert -- re-establish --, therefor.

Signed and Sealed this
Twenty-fifth Day of October, 2011

David J. Kappos
*Director of the United States Patent and Trademark Office*